July 31, 1928.
A. A. G. MAGIS
1,678,740
METHOD FOR JOINING PIPES
Filed Jan. 23, 1924
4 Sheets-Sheet 1
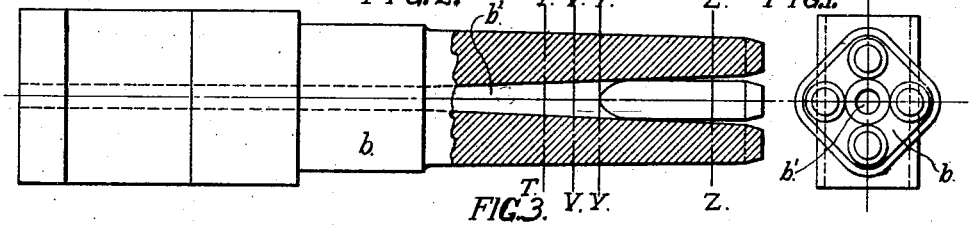
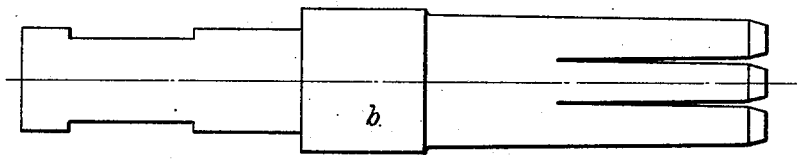
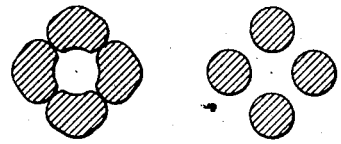
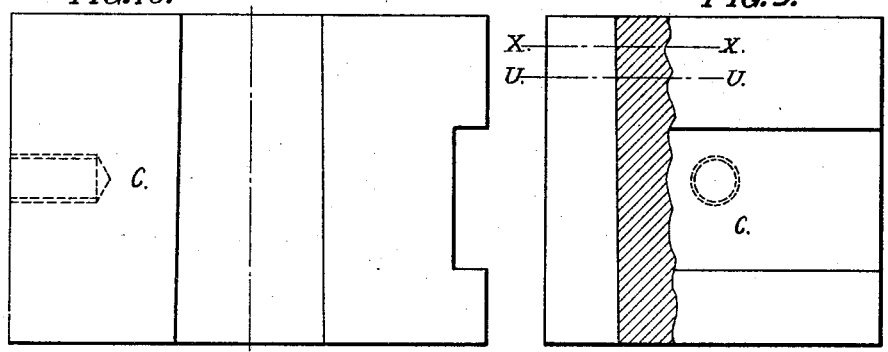
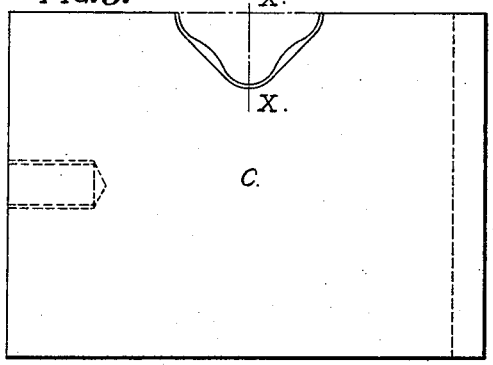
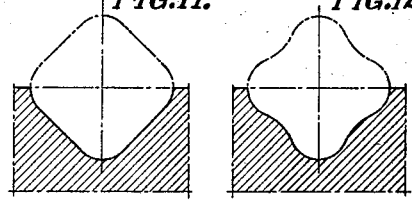
INVENTOR.
AUGUSTE ADELIN GUSTAVE MAGIS.
BY
O. V. Thiele
ATTORNEY.

July 31, 1928.
A. A. G. MAGIS
1,678,740
METHOD FOR JOINING PIPES
Filed Jan. 23, 1924
4 Sheets-Sheet 2
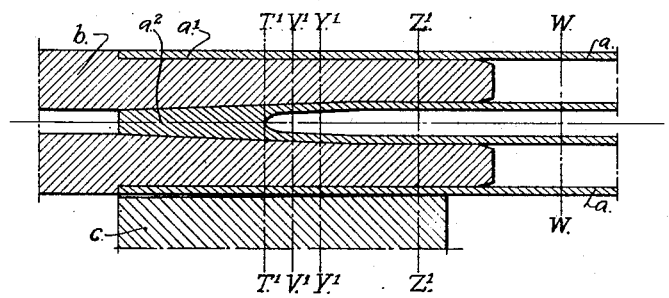
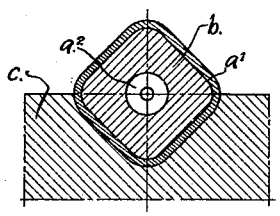
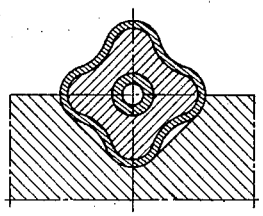
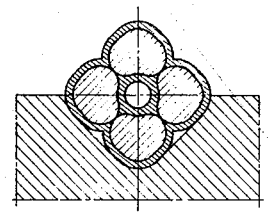
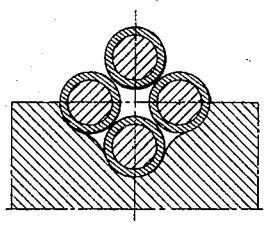
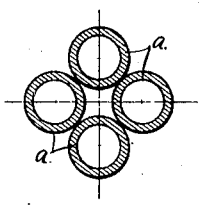
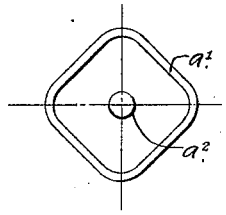
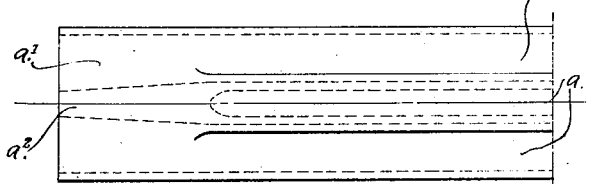
AUGUSTE ADELIN GUSTAVE MAGIS, INVENTOR.
BY
O. V. Thiele
ATTORNEY.

July 31, 1928.
A. A. G. MAGÍS
1,678,740
METHOD FOR JOINING PIPES
Filed Jan. 23, 1924     4 Sheets-Sheet 3
FIG. 22.
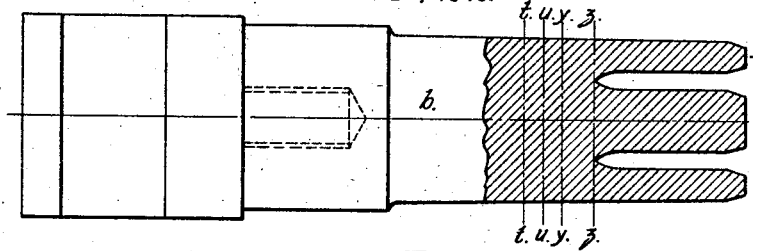
FIG. 21.
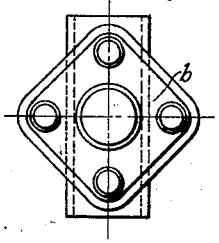
FIG. 23.
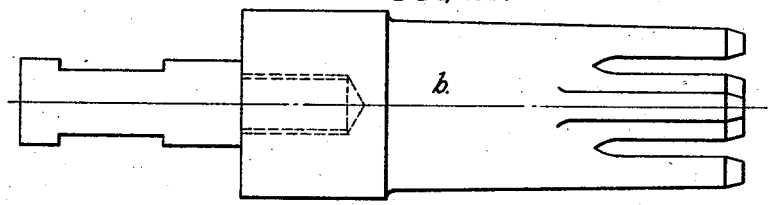
FIG. 24.
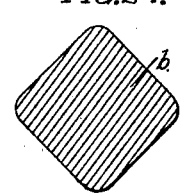
FIG. 25.    FIG. 26.    FIG. 27.      FIG. 31.
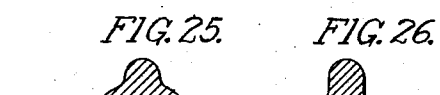
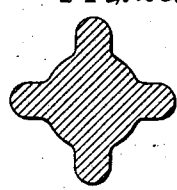
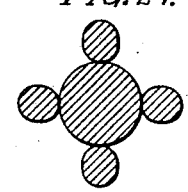
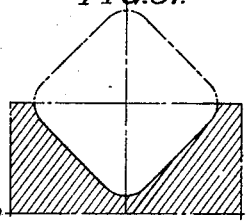
FIG. 30.
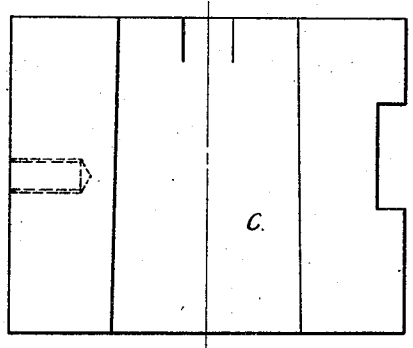
FIG. 29.
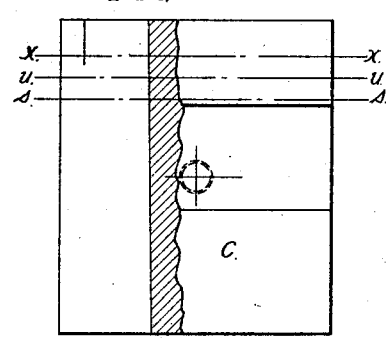
FIG. 28.
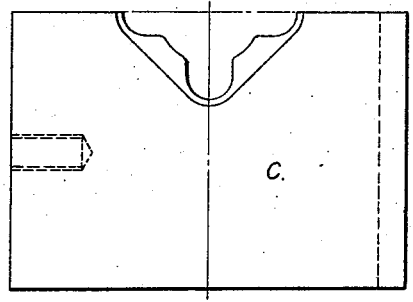
FIG. 32.
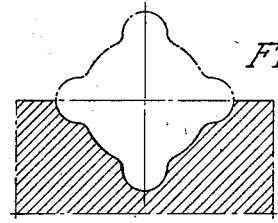
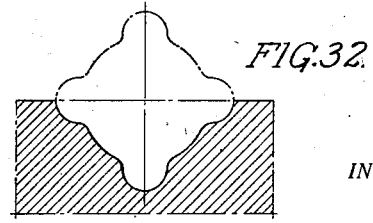
INVENTOR.
BY AUGUSTE ADELIN GUSTAVE MAGIS.
O. V. Thiel ATTORNEY.

July 31, 1928.  1,678,740
A. A. G. MAGIS
METHOD FOR JOINING PIPES
Filed Jan. 23, 1924  4 Sheets-Sheet 4
FIG.33.
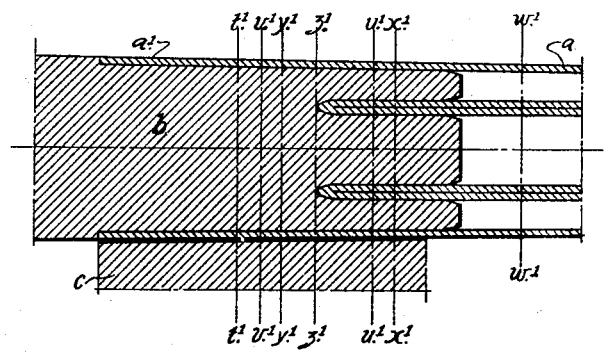
FIG.32.ª  FIG.34.  FIG.35.
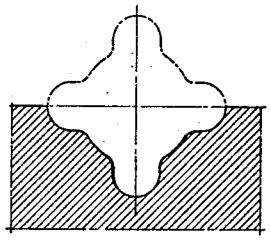 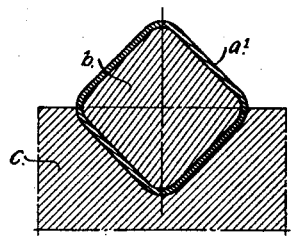 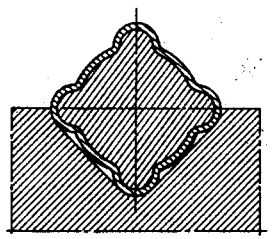
FIG.36.  FIG.37.  FIG.38.
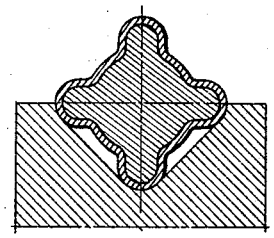 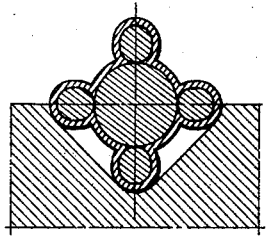 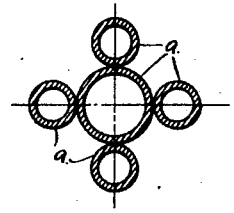
FIG.38.ª  FIG.38.ᵇ
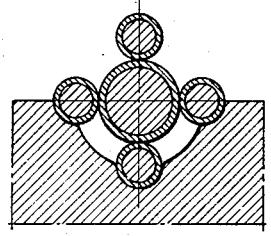 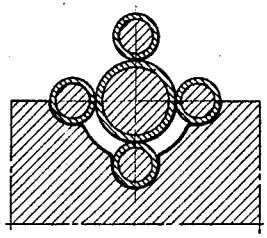
INVENTOR.
AUGUSTE ADELIN GUSTAVE MAGIS.
BY
*O. V. Thiele*
ATTORNEY.

Patented July 31, 1928.

1,678,740

UNITED STATES PATENT OFFICE.

AUGUSTE ADELIN GUSTAVE MAGIS, OF PARIS, FRANCE, ASSIGNOR TO THE SUPERHEATER COMPANY, OF NEW YORK, N. Y., A CORPORATION OF DELAWARE.

METHOD FOR JOINING PIPES.

Application filed January 23, 1924, Serial No. 688,001, and in France March 21, 1923.

In Patent 1,169,209 of January 25th, 1916, there is described a process for welding together two parallel tubes so that a return bend is formed. According to this process the two tubes are united by a single operation, by inserting into the tubes a bifurcated plunger, the two branches of which are connected by a web; the two tubes, having been raised to a welding heat, were split by said web; the edges of the split portions were bent outward and the welding of one edge of one tube with the edge of the other tube was accomplished by pressing between the plunger and the matrix.

To weld together the extremity of $n$ tubes, it would be necessary to perform $n$ or $n^1$ successive operations depending upon whether one wanted to connect the last tube to the first or not and at times it would be impossible to perform the last operation. In this manner there would be formed only a sort of a crown with an open center which could be closed by any desired means.

The present invention has for its object to simplify all these operations and to connect by a single stroke as many tubes as desired without its being necessary finally to close any central openings.

The process consists essentially in holding the tubes one against another or at a very small distance from each other, in heating their ends to a welding heat and in inserting in a direction parallel to their axes a plunger provided with a plurality of branches. This plunger has as many branches as there are tubes to be connected. The branches along adjacent sides are of a thickness which becomes progressively greater until they touch. They are prolonged into a single and continuous surface, which quickly merges into a convex shape and forms a breeches piece which is thereafter closed in any convenient manner to form a return bend for example, by the means described in Patent 1,169,209.

The succession of operations for forging by the process of the Patent 1,169,209 is the following:

(a) A splitting of the tubes along an element.

(b) The opening outward of the parts adjacent to the slit.

(c) The pressing of these edges between the male and female pieces, resulting in a weld.

In the process forming the subject matter of the present invention, however, the succession of the operations is as follows:

(a) The material of the tubes, taken two and two, is compressed between the branches of the plunger, which approach each other more and more, so that a welding results, since the material cannot move longitudinally, the tubes being very close together and cold at points only slightly removed from the place where the plunger is working.

(b) The welded portion is then split by the line along which the two branches of the plunger are joined, and each part slides along the plunger and unites with its corresponding surface.

It will be seen that no female dies are required to weld the tubes together. Nevertheless in order to obtain a uniform thickness of the piece produced a female die may be employed toward the open end of the resulting structure.

The following description taken in connection with the annexed drawing given by way of example will make it possible to understand the manner in which the invention is put into practice:

Figs. 1, 2 and 3 show in end view, side elevation (partly in section) and in plan view a plunger for connecting four tubes.

Figs. 4, 5, 6 and 7 are sections of the plunger at lines T—T, V—V, Y—Y and Z—Z of the plunger shown in Fig. 2;

Fig. 8 is an end view of the lower half of the female die which can be used if desired in combination with the plunger.

Fig. 9 is a longitudinal section on line XX—XX of the female die shown in Fig. 8;

Fig. 10 is a plan view of Fig. 9.

Figs. 11 and 12 are cross sections of the female die on lines U—U, X—X of Fig. 9.

Fig. 13 is a section of the four tubes after the welding has been completed.

Figs. 14, 15, 16, 17 and 18 are sections of T'—T', V'—V', Y'—Y', Z'—Z', W—W of Fig. 13.

Figs. 19 and 20 show in side view and in end view the four connected tubes.

Figs. 21 to 38 are corresponding views relating to the connection by welding of four external tubes to an inner tube of larger diameter.

Figs. 21, 22 and 23 are views of the plunger.

Figs. 24, 25, 26 and 27 are sections on $t$—$t$, $v$—$v$, $y$—$y$ and $z$—$z$ of Fig. 22.

Figs. 28, 29 and 30 show the female die.

Figs. 31, 32 and 32$^a$ are sections on $s$—$s$, $u$—$u$, $x$—$x$ of Fig. 29.

Fig. 33 shows a section of the tubular bundle after the welding is completed.

Figs. 34, 35, 36, 37, 38, 38$^a$ and 38$^b$ are sections of Fig. 33 on lines $t'$—$t'$, $v'$—$v'$, $y'$—$y'$, $z'$—$z'$, $x'$—$x'$ and $w'$—$w'$.

The tubes $a$, which are to be connected by the present process are heated at their common extremities to a welding heat and are held by any convenient device at a certain distance from their extremities at a point where they are cold and therefore absolutely rigid.

The plunger with its plurality of branches $b$ is then inserted into all the tubes and completely forced in, the bundle of pipes being either placed in a female die $c$ or not. By forcing the plunger inward there will result, as an inspection of the drawing will show, first a pressing together and then a welding of the contiguous tubes two by two, thereupon a slitting of the tubes so welded and a lateral spreading of the edges which slip along the plunger in such a way as finally to form a hollow cylinder or piece $a'$, following the full form of the plunger.

The plunger is then withdrawn and the piece is closed by any desired means.

In welding four tubes according to Figs. 1 to 20, it should be noted that the plunger $b$ has an axial opening $b'$ into which there is forced all that part of the metal which, as will be seen in Fig. 16, is separated in the central portion by the branches of the plunger. After the welding is completed, the tubular group will have within the cylindrical part $a'$ a solid cylinder of metal $a^2$, Figs. 19 and 20, which if desired may be removed.

It will be seen that modifications can be introduced to this process or apparatus which has just been described without lessening the spirit of the present invention.

What I claim is:

1. The method of making a structure of the kind referred to comprising the steps of holding a plurality of pipes in parallel relation in the relative position they are to occupy in the finished structure, heating the portions of the pipes to be joined to a suitable temperature, pressing portions of the wall of each pipe against the adjacent portions of two neighboring pipes thereby welding the walls together, and thereafter splitting the welded walls so that the interior of each pipe opens into the interior of the adjacent pipes.

2. The method of making a structure of the kind referred to comprising the steps of holding a plurality of pipes in parallel relation in the relative position they are to occupy in the finished structure heating the portions of the pipes to be joined to a suitable temperature, pressing the wall of one pipe against the adjacent wall of a neighboring pipe thereby welding the walls together for a distance, and thereafter splitting the welded walls so that the interior of the first pipe opens into the interior of the other pipe.

3. The method of making a structure of the kind referred to comprising the steps of holding a plurality of pipes in parallel relation in the relative position they are to occupy in the finished structure, heating the portions of the pipes to be joined to a suitable temperature, pressing portions of the wall of one pipe against the adjacent portions of two neighboring pipes thereby welding the walls together, and thereafter splitting the welded walls so that the interior of said first pipe opens into the interior of the other two pipes.

4. The method of making a structure of the kind referred to comprising the steps of holding a plurality of pipes in parallel relation in the relative position they are to occupy in the finished structure, heating the portions of the pipes to be joined to a suitable temperature, pressing portions of the wall of one pipe against the adjacent portions of two neighboring pipes by means of a tool inserted into the pipes thereby welding the walls together, and thereafter splitting the welded walls so that the interior of said first pipe opens into the interior of the other two pipes.

In testimony whereof I have signed this specification.

AUGUSTE ADELIN GUSTAVE MAGIS.